(12) United States Patent
Wei et al.

(10) Patent No.: US 11,007,611 B2
(45) Date of Patent: May 18, 2021

(54) DOUBLE-ROW SLOT PLUNGE MILLING PROCESSING METHOD FOR INTEGRAL IMPELLERS

(71) Applicant: Dalian University of Technology, Liaoning (CN)

(72) Inventors: Zhaocheng Wei, Liaoning (CN); Minjie Wang, Liaoning (CN)

(73) Assignee: Dalian University of Technology, Liaoning (CN)

( * ) Notice: Subject to any disclaimer, the term of this patent is extended or adjusted under 35 U.S.C. 154(b) by 157 days.

(21) Appl. No.: 16/485,018

(22) PCT Filed: Mar. 17, 2017

(86) PCT No.: PCT/CN2017/077064
§ 371 (c)(1),
(2) Date: Aug. 9, 2019

(87) PCT Pub. No.: WO2018/145349
PCT Pub. Date: Aug. 16, 2018

(65) Prior Publication Data
US 2020/0039009 A1 Feb. 6, 2020

(30) Foreign Application Priority Data
Feb. 10, 2017 (CN) .......................... 201710073711.5

(51) Int. Cl.
*B23P 15/02* (2006.01)
*B23C 3/18* (2006.01)

(52) U.S. Cl.
CPC ................ *B23P 15/02* (2013.01); *B23C 3/18* (2013.01)

(58) Field of Classification Search
CPC ....... B23P 15/02; B23C 3/18; B23C 2220/56; B23C 2215/52; B23C 2215/56
See application file for complete search history.

(56) References Cited

U.S. PATENT DOCUMENTS

2007/0124933 A1 6/2007 Burgess et al.
2017/0095865 A1* 4/2017 Caldicott .................. B23C 3/18

FOREIGN PATENT DOCUMENTS

CN 102085576 A 6/2011
CN 103056625 A 4/2013
(Continued)

*Primary Examiner* — Lee A Holly
(74) *Attorney, Agent, or Firm* — Novick, Kim & Lee, PLLC; Allen Xue

(57) ABSTRACT

A double-row slot plunge milling processing method for integral impellers, which comprises planning a double-row plunge milling cutter path along two side blades of an impeller flow channel; a cutter arrangement sequence of the cutter path following the direction of an inlet and outlet of the flow channel; determining cutter diameter according to the width of a bottom portion of a cross-section of the flow channel and segmenting the flow channel, the width of a bottom portion of the cross-section of each segmented flow channel being greater than one times the cutter diameter and smaller than two times the cutter diameter. Compared with existing methods for layer cutting of high feed, the present invention can increase rough-processing efficiency of integral impellers by more than 50%, while facilitating the elimination of plunge milling cutter bumping, and effectively reducing redundant cutter paths; the implementation process being simple and facilitating CAM software integration.

1 Claim, 3 Drawing Sheets

(56) References Cited

FOREIGN PATENT DOCUMENTS

| CN | 104384586 A | 3/2015 |
| CN | 106624667 A | 5/2017 |

\* cited by examiner

DOUBLE-ROW SLOT PLUNGE MILLING PROCESSING METHOD FOR INTEGRAL IMPELLERS

TECHNICAL FIELD

The invention relates to the field of mechanical processing and tools, relates to plunge milling processing of integral impellers, and relates to a double-row slot plunge milling processing method for integral impellers in details.

BACKGROUND ART

An integral impeller is a core component of turbomachinery such as centrifugal compressor and turbine engine, and has a wide application. With the development of science and technology and technological progress, the market competition of turbomachinery is becoming more and more fierce. The improvement of the impeller processing efficiency and the reduction of the production costs are goals pursued by major turbomachinery companies.

Cutting processing is a main method in integral impeller manufacturing, and due to a geometric characteristic of impeller part, more than 70% of workpiece materials need to be removed, and most of them need to be removed in the rough processing stage. Therefore, it is very important to improve the efficiency of rough processing of the integral impeller. Positioned five-axis milling processing, commonly known as 3+2 processing, is currently a commonly used processing method for rough processing of the integral impeller. Compared with the previous five-axis linkage end milling rough processing method, the positioned five-axis milling processing method matching with the high feed cutter developed and matured in recent years can obviously improve the efficiency of rough processing of the integral impeller.

Plunge milling processing is a newly arisen milling processing technology in recent ten years, and in the process, a cutter moves along an axial direction by using a bottom cutting edge to process. Compared with high feed layer cutting processing, the plunge milling processing has a smaller radial force and a better cutting stability. Some literatures reporting the successful application of the plunge milling technology show that the plunge milling processing can improve the processing efficiency by 50%, or even more than twice. However, since the plunge milling processing technology is still under development, most of the reported plunge milling processing technologies only introduce how to realize plunge milling, and fail to thoroughly discuss a detailed arrangement method of the plunge milling technology on the basis of improving the processing efficiency and eliminate redundant cutter paths. Since the high feed layer cutting processing technology has been developed very maturely, and the processing efficiency has reached a certain level, it is difficult to obtain the expected improvement of processing efficiency if the arrangement of plunge milling technology is unreasonable and there are too many redundant cutter paths.

SUMMARY OF THE INVENTION

Aiming at the technical problems above and slot plunge milling processing of integral impellers, this invention provides a double-row slot plunge milling processing method for integral impellers, which is intended to simplify cutter paths of plunge milling of a flow channel of the impeller and improve an efficiency of plunge milling processing of the flow channel of the integral impeller.

The objects above are achieved by the following technical solutions.

A double-row slot plunge milling processing method for a semi-open integral impeller comprises the following steps of:

step 1: obtaining CAD model data of an integral impeller;

step 2: obtaining width data of a bottom portion of a cross-section of a flow channel; analyzing the CAD model, and obtaining discrete data of width change of the bottom portion of the cross-section of the flow channel from outlet to inlet by software measurement and other methods;

step 3: determining a direction of plunge milling cutter arrangement; according to a width of the bottom portion of the cross-section of the flow channel of the impeller, selecting a cutter with a diameter smaller than a minimum value of the width of the bottom portion of the cross-section of the flow channel of the impeller, and planning a single-row plunge milling cutter path along a middle line of the flow channel by using a CAM software platform or a high-level computer language programming method; through cutting simulation, judging whether cutter bumping is not generated in cutter arrangement from the inlet to outlet or from the outlet to inlet, and selecting a direction without the cutter bumping as a direction of the plunge milling cutter arrangement;

step 4: according to the determined direction of plunge milling cutter arrangement in step 3, segmenting the flow channel of the impeller into a plurality of segments along a direction of the inlet and the outlet, and selecting a size of the cutter according to the width of the bottom portion of the cross-section of the flow channel of each segment;

if the cutter is arranged from the outlet to inlet of the flow channel, using the outlet end as a starting point of first segment, and selecting the diameter of the cutter based on a principle that the diameter is greater than 50% of the width of the bottom portion of the cross-section of the flow channel at the starting point of the segment and less than 80% of the width of the bottom portion of the cross-section of the flow channel at the starting point of the segment; according to the selected diameter of the cutter, using a position where the width of the bottom portion of the cross-section of the flow channel equal to 1.02 to 1.05 times the diameter of the cutter as an end point of the first segment, and processing each segment by only one cutter; using the end point of the first segment as a starting point of a second segment, and repeating the steps above until reaching the inlet end of the flow channel;

if the cutter is arranged from the inlet to outlet of the flow channel, using the inlet end as the starting point of the first segment of the flow channel, and selecting the diameter of the cutter based on a principle that the diameter is less than 98% of the width of the bottom portion of the cross-section of the flow channel at the starting point of the segment and greater than 50% of the width of the bottom portion of the cross-section of the flow channel at the starting point of the segment; according to the selected diameter of the cutter, using a position where the width of the bottom portion of the cross-section of the flow channel equal to 1.4 to 1.6 times the diameter of the cutter as the end point of the first segment, and processing each segment by only one cutter; using the end point of the first segment as the starting point of the second segment, and repeating the steps above until reaching the outlet end of the flow channel;

step 5: projecting a double-row plunge milling cutter path along two side blades of the flow channel;

according to each segmented flow channel and the size of the cutter determined in the fourth 4, projecting the double-row plunge milling cutter path along the direction of the inlet and outlet of the flow channel by the CAM software platform or the high-level computer language programming method; performing a cutter arrangement sequence of each segment in strict accordance with the cutter arrangement sequence in the step 3, only the cutter arrangement sequence of the last segment being reversed; in each segment, determining a priority sequence of the cutter paths of left row and right row according to plunge milling depth cutting simulation, processing a deep plunge milling row first, and then processing a shallow plunge milling row; and step 6: processing the arranged cutter paths into a numerical control processing program, and driving a machine tool to finish rough processing of the flow channel of the impeller.

By adopting the technical solutions above, the invention can effectively reduce a number of the plunge milling processing cutter paths and ensure the high efficiency of the plunge milling processing. In addition, the cutter paths are arranged along the direction of the inlet and outlet of the flow channel, which is convenient to eliminate the cutter bumping in the plunge milling process, is beneficial to the smooth implementation of the plunge milling processing, and reduces cutting vibration. The invention has a simple implementation process, is convenient for CAM software integration, and has a good application prospect.

The description above is merely an overview of the technical solutions of the invention, in order to better understand the technical solutions of the invention, it can be implemented according to the contents of the description, and in order to make the above and other objects, features and advantages of the invention more obvious and understandable, the following is some description of the embodiments with reference to the drawings.

DETAILED DESCRIPTION OF THE EMBODIMENTS

Figure 1:
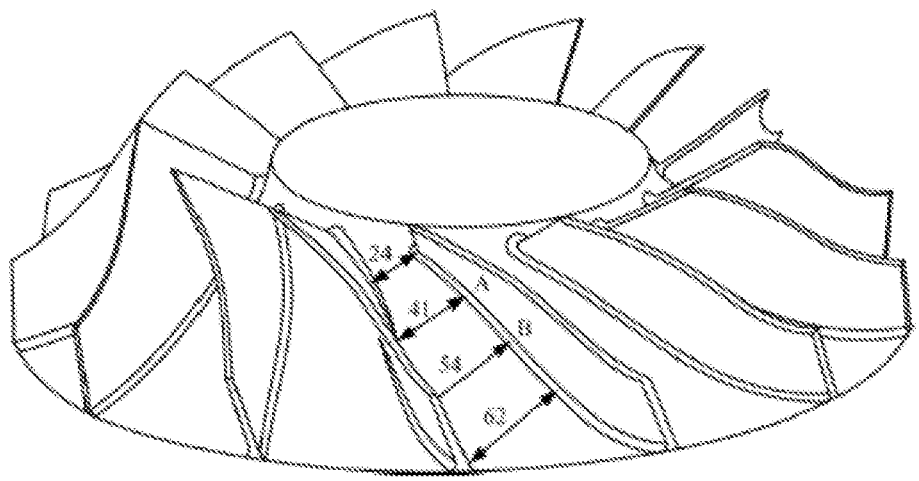
FIG. 1 is a diagram of a CAD model of a semi-open integral impeller according to the invention.
Figure 2:
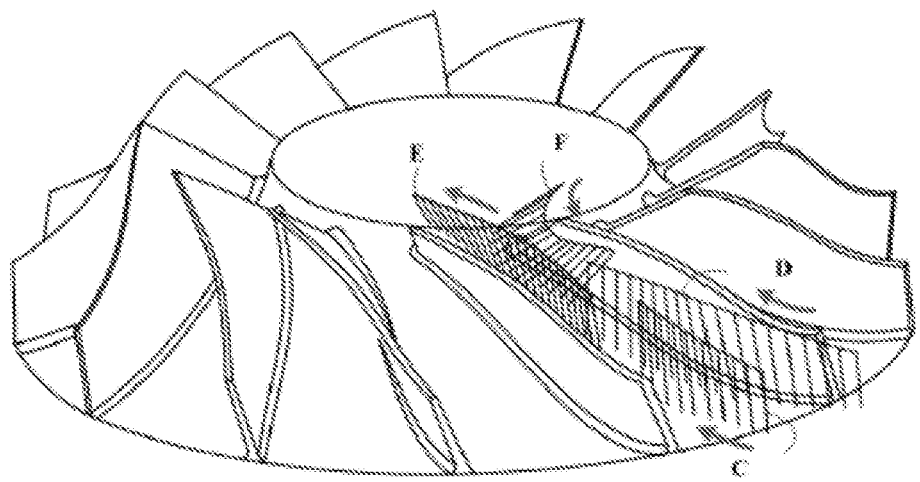
FIG. 2 is a diagram illustrating double-row slot plunge milling processing cutter paths and feeding sequence according to the invention.

A double-row slot plunge milling processing method for an integral impeller comprises the following steps.

step 1: CAD model data of an integral impeller are obtained, as shown in FIG. 1;

step 2: the CAD model is analyzed, and width data of a bottom portion of a cross-section of a flow channel are obtained (assuming that a width of the flow channel at an inlet end is 24 mm, a width of the flow channel at point A is 41 mm, a width of the flow channel at point B is 54 mm, and a width of the flow channel at an outlet end is 62 mm), as shown in FIG. 2.

step 3: a plunge milling cutter with a diameter of 21 mm is selected according to a minimum width of the bottom portion of the cross-section of the flow channel, and a single-row plunge milling cutter path is projected along a middle line of the flow channel. Through processing simulation, cutter bumping is determined not to be generated in cutter arrangement along a direction from the outlet to inlet of the flow channel. Therefore, the direction from the outlet to inlet is selected as a direction of the plunge milling cutter arrangement.

step 4: the flow channel is segmented using the outlet end of the flow channel as a starting point, according to the width of the bottom portion of the cross-section of the flow channel at the outlet end, a diameter of a first segment of plunge milling cutter is selected to be 40 mm, and the position of point A of the flow channel is used as an end point of the first segment. Meanwhile, the position of point A is used as a starting point of the second segment, and according to the width of the bottom portion of the cross-section of the flow channel at point A, a diameter of the second segment of plunge milling cutter is selected to be 21 mm, and the inlet end of the flow channel is used as an end point of the second segment.

step 5: according to each segmented flow channel and the size of the cutter thereof determined in step 4, the double-row slot plunge milling cutter path is projected along the direction of the inlet and outlet of the flow channel by the CAM software platform or the high-level computer language programming method. The first segment (comprising: a segment C and a segment D in FIG. 2, wherein the segment C is the first segment in left row, and the segment D is the first segment in right row) is processed first, and then the second segment (comprising: a segment E and a segment F in FIG. 2, wherein the segment E is the second segment in the left row and the segment F is the second segment in the right row) is processed. According to a processing depth simulation result, in the first segment, the cutter path in the right row (segment D) is processed first, and then the cutter path in the left row (segment C) is processed. In the second segment, the cutter path in the left row (segment E) is processed first, and then the cutter path in the right row (segment F) is processed reversely.

Figure 3:
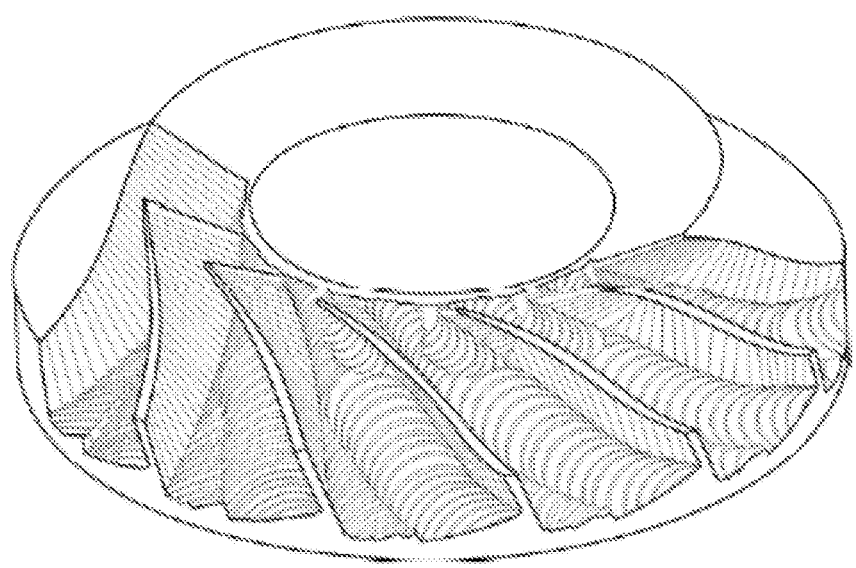
FIG. 3 is a diagram of an integral impeller after plunge milling processing according to the invention.

Step 6: the arranged cutter paths are processed into a numerical control processing program, and a machine tool is driven to finish rough processing of the flow channel of the impeller. A workpiece processed is as shown in FIG. 3.

The foregoing is merely some embodiments of the invention and is not intended to limit the invention in any form. Although the invention has been disclosed in the embodiments above, the embodiments are not intended to limit the invention. Those skilled in the art can make some changes or modifications to equivalent embodiments with equivalent changes by using the technical contents disclosed above without departing from the scope of the invention. However, any simple modifications, equivalent changes and decorations made to the embodiments above according to the technical essence of the invention without departing from the contents of the technical solutions of the invention are still included in the scope of the invention.

The invention claimed is:

1. A double-row slot plunge milling processing method for integral impellers, comprising the following steps of:
   step 1: obtaining CAD model data of an integral impeller;
   step 2: obtaining width data of a bottom portion of a cross-section of a flow channel; analyzing the CAD model, and obtaining discrete data of width change of the bottom portion of the cross-section of the flow channel from outlet to inlet by software measurement;
   step 3: determining a direction of plunge milling cutter arrangement; according to a width of the bottom portion of the cross-section of the flow channel of the impeller, selecting a cutter with a diameter smaller than a minimum value of the width of the bottom portion of the cross-section of the flow channel of the impeller, and planning a single-row plunge milling cutter path along a middle line of the flow channel by using a CAM software platform or a high-level computer language programming method; through cutting simulation, judging whether cutter bumping is not generated in cutter arrangement from the inlet to outlet or from the outlet to inlet, and selecting a direction without the cutter bumping as a direction of the plunge milling cutter arrangement;

step 4: according to the determined direction of plunge milling cutter arrangement in step 3, segmenting the flow channel of the impeller into a plurality of segments along a direction of the inlet and outlet, and selecting a size of the cutter according to the width of the bottom portion of the cross-section of the flow channel of each segment;

if the cutter is arranged from the outlet to inlet of the flow channel, using the outlet end as a starting point of first segment, and selecting diameter of the cutter based on a principle that the diameter is greater than 50% of the width of the bottom portion of the cross-section of the flow channel at the starting point of the segment and less than 80% of the width of the bottom portion of the cross-section of the flow channel at the starting point of the segment; according to the selected diameter of the cutter, using a position where the width of the bottom portion of the cross-section of the flow channel equal to 1.02 to 1.05 times the diameter of the cutter as an end point of the first segment, and processing each segment by only one cutter; using the end point of the first segment as a starting point of a second segment, and repeating the steps above until reaching the inlet end of the flow channel;

if the cutter is arranged from the inlet to outlet of the flow channel, using the inlet end as the starting point of the first segment of the flow channel, and selecting the diameter of the cutter based on a principle that the diameter is less than 98% of the width of the bottom portion of the cross-section of the flow channel at the starting point of the segment and greater than 50% of the width of the bottom portion of the cross-section of the flow channel at the starting point of the segment; according to the selected diameter of the cutter, using a position where the width of the bottom portion of the cross-section of the flow channel equal to 1.4 to 1.6 times the diameter of the cutter as the end point of the first segment, and processing each segment by only one cutter; using the end point of the first segment as the starting point of the second segment, and repeating the steps above until reaching the outlet end of the flow channel;

step 5: projecting a double-row plunge milling cutter path along two side blades of the flow channel;

according to each segmented flow channel and the size of the cutter determined in step 4, projecting the double-row plunge milling cutter path along the direction of the inlet and outlet of the flow channel by the CAM software platform or the high-level computer language programming method; performing a cutter arrangement sequence of each segment in strict accordance with the cutter arrangement sequence in step 3, only the cutter arrangement sequence of the last segment being reversed; in each segment, determining a priority sequence of the cutter paths of left row and right row according to plunge milling depth cutting simulation, processing deep plunge milling row first, then processing shallow plunge milling row; and step 6: processing the arranged cutter paths into a numerical control processing program, and driving a machine tool to finish rough processing of the flow channel of the impeller.

\* \* \* \* \*